United States Patent [19]

Allenson

[11] Patent Number: 4,917,803
[45] Date of Patent: Apr. 17, 1990

[54] WATER CLARIFICATION PROCESS

[75] Inventor: Stephan J. Allenson, Richmond, Tex.

[73] Assignee: Nalco Chemical Company, Naperville, Ill.

[21] Appl. No.: 393,139

[22] Filed: Aug. 14, 1989

Related U.S. Application Data

[62] Division of Ser. No. 317,763, Mar. 2, 1989, Pat. No. 4,873,280.

[51] Int. Cl.$^4$ ............................................. C02F 1/56
[52] U.S. Cl. .................................... 210/728; 210/733; 252/181
[58] Field of Search .............. 210/725, 727, 728, 733, 210/734; 252/181

[56] References Cited

U.S. PATENT DOCUMENTS

| | | | |
|---|---|---|---|
| 3,453,207 | 7/1969 | Eck et al. | 210/728 |
| 3,456,796 | 7/1969 | Eck et al. | 210/728 |
| 3,656,889 | 4/1972 | Olewinski | 23/52 |
| 4,067,806 | 1/1978 | Mauceri | 210/728 |
| 4,413,680 | 11/1983 | Sandiford et al. | 166/270 |
| 4,690,971 | 9/1987 | Flesher et al. | 524/555 |

FOREIGN PATENT DOCUMENTS

| | | |
|---|---|---|
| 964808 | 3/1975 | Canada . |
| 2058274 | 6/1971 | Fed. Rep. of Germany . |
| 82122 | 5/1971 | German Democratic Rep. . |
| 46-37417 | 11/1971 | Japan . |
| 48-66573 | 9/1973 | Japan . |
| 49-3751 | 1/1974 | Japan . |
| 49-20764 | 5/1974 | Japan . |
| 51-149348 | 12/1976 | Japan . |
| 52-35229 | 3/1977 | Japan . |
| 54-101908 | 8/1979 | Japan . |
| 51-109032 | 9/1979 | Japan . |
| 54-151524 | 11/1979 | Japan . |
| 57-119974 | 7/1982 | Japan . |
| 57-135853 | 8/1982 | Japan . |
| 57-205597 | 12/1982 | Japan . |
| 58-186699 | 10/1983 | Japan . |
| 59-100272 | 6/1984 | Japan . |
| 59-102910 | 6/1984 | Japan . |
| 6509708 | 1/1966 | Netherlands . |
| 413206 | 1/1976 | Spain . |
| 1049515 | 10/1983 | U.S.S.R. . |
| 1373691 | 2/1988 | U.S.S.R. ............................. 210/728 |

OTHER PUBLICATIONS

Abstract of: Proc. Ind. Waste Cruf., 37 203–6, 1983.
Abstract of: Ind. Waste, 28(3), 14–16, (1982).
Abstract of U.S. Pat. No. 3,617,542, (Boehler), 11–71.
Assoc. Mex Tec. Ind. Celul. Pap. (Bol.), 6(4), 311–18, (1967).

*Primary Examiner*—Peter Hruskoci
*Attorney, Agent, or Firm*—Joan I. Norek; Robert A. Miller; Donald G. Epple

[57] ABSTRACT

An aqueous solution blend of cationic metal salt and anionic vinyl polymer may be prepared. A composition comprising the combination of a cationic metal salt, anionic vinyl polymer, and water may be used in water clarification process.

10 Claims, No Drawings

WATER CLARIFICATION PROCESS

This is a division of application Ser. No. 07/317,763, filed 03/02/89, now U.S. Pat. No. 4,873,280.

TECHNICAL FIELD OF THE INVENTION

The present invention is in the technical field of water clarification processes and chemical compositions active in such processes, and more particularly in the field of such processes and compositions wherein the action of both a coagulant, particularly a metal salt coagulant, and a flocculant is desired.

BACKGROUND OF THE INVENTION

In water clarification programs there is often a need for the action of both a coagulant and a flocculant. For instance, in many oil field water clarification programs a coagulant of the metal salt type is used to coagulate the oil and solids of the water to be clarified and a flocculant of the anionic polymer type is used to flocculate the particles into large masses or aggregates.

Dual treatments inherently present greater handling problems than a single treatment program. When two compositions are being introduced at any treatment facility, generally the equipment and installations required, such as chemical pumps and injection points, are double that required for a single composition treatment.

Alkali metal aluminates, such as sodium aluminate, are well known as active in clarifying waste waters. Sodium aluminate is often used in conjunction with anionic polymers to provide a dual treatment comprising both a coagulant and flocculant. In the past blending such compositions before introduction into the waste water was not possible due to the cationic/anionic interaction between the sodium aluminate and anionic polymers whereby the activities of the components were diminished or destroyed. Thus such compositions are introduced into waters to be clarified separately, requiring extra feed equipment, tankage, injection points, and more servicing than would be required with a single composition treatment.

It is an object of the present invention to provide a water clarification process wherein both a metal salt type coagulant and an anionic polymer flocculant are introduced to the water being treated as a single composition while the integrities of the components are substantially retained. It is an object of the present invention to provide a water clarification composition comprising both a coagulant and a flocculant, each substantially in an active state and substantially available for independent coagulation and flocculation activity upon introduction into the water to be treated. It is an object of the present invention to provide a method of preparing a composition comprising an active coagulant and active flocculant in combination in aqueous solution. These and other objects are discussed in more detail below.

DISCLOSURE OF THE INVENTION

The present invention provides a method of preparing an aqueous solution blend of cationic metal salt and carboxylate-containing vinyl polymer comprising admixing an aqueous solution of cationic metal salt having a pH of at least 10 with a water-external emulsion containing a dispersed-phase carboxylate-containing vinyl polymer, wherein the admixture is conducted under agitation and the pH of the admixture is maintained at at least 10. The carboxylate-containing vinyl polymer preferably is comprised of at least 90 weight percent of units having the Formula I as follows:

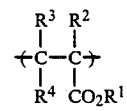

wherein $R^1$ is hydrogen, alkali metal cation, ammonia cation, or alkyl of 1 to 16 carbon atoms, and $R^2$, $R^3$, and $R^4$ are each independently hydrogen, alkyl of 1 to 16 carbon atoms, or a carboxylic acid moiety or water soluble salt thereof, provided the polymer contains no more than 70 weight percent of units of Formula I comprised of a carboxylic acid or water soluble salt thereof moiety and less than 10 total carbon atoms.

In preferred embodiments the cationic metal salt is an alkali metal aluminate, such as sodium aluminate, and the water-external emulsion containing the disperse-phase polymer is a polymer latex prepared by emulsion polymerization.

The present invention also provides a composition comprised of a cationic metal salt, an anionic vinyl addition polymer, and water wherein the composition is an ungelled solution having a pH of at least 10 and the anionic vinyl polymer is derived from a carboxylate-containing vinyl polymer, and a process for clarifying water by adding thereto an effective amount of such composition.

PREFERRED EMBODIMENTS OF THE INVENTION

Coagulants are generally used in water clarification applications to reduce the generally negative surface charges of solids dispersed in waters to be clarified, typically waste waters of some type, and thus reduce the electrostatic repulsion between the dispersed solids' particles which inhibit agglomeration. Cationic metal salts, such as the alkali aluminates, as coagulants or coagulating agents, may be advantageously combined with carboxylate-containing vinyl polymer, particularly polymer comprised of at least 90 weight percent of units having the Formula I as defined above. Such polymer would be anionic or in the instance of no free carboxylic acid or water soluble salt functionality would readily become so, particularly in an aqueous environment at elevated pH, by hydrolysis of some carboxylate ester functionality when $R^1$ is alkyl. Such polymer would facilitate water clarification by flocculating particles into larger masses or aggregates, and is generally made by the polymerization of ethylenically, unsaturated monomers including acids such as acrylic acid, methacrylic acid, crotonic acid, itaconic acid, ethyl acrylic acid, maleic acid, and the water soluble alkali metal and ammonia salts of such acids, monomeric anhydrides such as acrylic anhydride, maleic anhydride, crotonic anhydride, and carboxylic ester containing monomers such as methyl acrylate, ethyl acrylate, methyl methacrylate, ethyl methacrylate, butyl acrylate, ethylhexyl acrylate, and the like.

Heretofore the admixture of such cationic metal salt and polymer in suitable vehicle would result cationic-/anionic interaction between components leading to gelling or precipitation, diminishing if not destroying the separate cationic and anionic functionalities of such components that are necessary for coagulation and flocculation activities. The method of the present invention, the admixture of the polymer in the dispersed phase of a water-external emulsion with an aqueous solution of the cationic metal salt at pH of at least 10, which pH minimum is observed for the admixture throughout, under agitation, provides a solution blend of the cationic metal salt and vinyl polymer in ungelled solution form in which the integrities of each component as cationic coagulant and anionic flocculant are at least substantially retained.

In preferred embodiment the polymer is added as a water-external polymer latex, preferably formed by emulsion polymerization. Emulsion polymerization processes suitable for making such latices are well known in the art, and may provide polymer latices in suitable form for addition to the aqueous metal salt solution without any additional process steps. As discussed in more detail below, the admixture preferably should be conducted slowly under agitation to assure rapid intermixing of the polymer emulsion and metal salt solution, and hence such purpose may be facilitated by the use of a polymer latex having 50 weight percent or less polymer solids. Such latices may be prepared at higher polymer solids and admixed at such concentration if, given the admixing conditions, the polymer concentration does not interfere with reasonably rapid intermixing of the polymer and the metal salt solution, or a latex of any given concentration may be diluted with water to provide a convenient polymer concentration for admixture. Such dilution may be done prior to admixing or during admixture.

Such water external emulsion could also be made by first recovering the polymer from whatever vehicle is used during the polymerization and then dispersing the polymer in water with suitable means, such as suitable surface active agents, to form a stable dispersion of the polymer within the water. Generally such preparation method would be inconvenient and commercially impractical compared to synthesizing the polymer in the first instance as a water-external latex.

The polymer may be a homopolymer, for instance a homopolymer of carboxylic esters such as ethyl acrylate or methyl methacrylate, or a polymer produced by the polymerization of more than one type of monomer, such as copolymers, terpolymers, and the like, and may include methylacrylate/acrylic acid copolymers, ethyl acrylate/methacrylic acid copolymers, methylacrylate/maleic anhydride copolymers, and the like, or ethylacrylate/butylacrylate/acrylic acid polymers, ethylhexylacrylate/methylmethacrylate/methacrylic acid polymers, ethylmethacrylate/ethyl acrylic acid polymers, and the like, provided that such polymers contain no more than 70 weight percent of units of Formula I above comprising a free carboxylic acid or water soluble salt thereof functionality and less than 10 total carbon atoms (including both carbon atoms of the polymer backbone and pendant groups). The polymer, to be held in the dispersed phase of a stable water-external latex or emulsion, may not be overly water soluble. In preferred embodiment, the polymer should contain no more than 60 weight percent of units of Formula I containing a free carboxylic acid or water soluble salt thereof moiety and less than 6 total carbons, and no more than 35 weight percent of units of Formula I containing more than one free carboxylic acid or water soluble salt thereof functionalities.

In more preferred embodiment the carboxylate-containing vinyl polymer is comprised of at least 95 weight percent of units having the Formula I above wherein $R^1$ is hydrogen, alkali metal cation, ammonia cation, or alkyl of 1 to 4 carbon atoms, and $R^2$, $R^3$, and $R^4$ are independently hydrogen or alkyl wherein $R^2$, $R^3$, and $R^4$ together comprise no more than 2 carbon atoms, and wherein the polymer contains no more than 70 weight percent of such units containing a carboxylic acid or water soluble salt thereof moiety. Such polymer may be a homopolymer of acrylic esters such a butyl acrylate, isobutyl acrylate, ethyl acrylate, and methyl acrylate, and the like, or copolymers of such esters with acrylic acid or methacrylic acid, and the like, or may contain more than two species of such monomers.

As indicated above, the term "carboxylate-containing" refers to the inclusion of pendant carboxylic esters, carboxylic acids, or water soluble salts of carboxylic acids, i.e., alkali metal and ammonia salts.

The carboxylate-containing vinyl polymer described above preferably should have a molecular weight of at least 500,000, and more preferably of at least 1,000,000 (each as average molecular weight).

The polymer may contain up to 10 weight percent of unit(s) not within Formula I above, such as those derived from other ethylenically unsaturated monomers such as styrene, methyl vinyl ketone, propylene, acrylonitrile, acrylamide, vinyl acetate and the like or other units, provided that the type and amount thereof does not so increase the water solubility of the polymer to unstabilize the water-external emulsion or latex nor interfere with the polymer's activity in water clarification.

In preferred embodiment the admixture is conducted at elevated temperature, preferably at a temperature of from about 105° F. to about 250° F., to reduce the amount of time over which the admixture takes place. The admixing should be done slowly over a period of time and lower temperature environments will require slower admixing.

In an embodiment the polymer emulsion or latex is admixed with the metal salt solution by adding the emulsion or latex to the solution. By this method, the pH of the admixture may be maintained at at least 10 without adjustment during admixing by use of a metal salt solution of sufficiently high pH.

The aqueous solution blend of cationic metal salt and anionic vinyl polymer prepared as described above is introduced into water to be clarified in amount effective to clarify water by coagulant and flocculant activity. In preferred embodiment the aqueous solution blend is introduced into water to be clarified to provide a level of combined polymer and cationic metal salt in such waters of from about 0.5 to about 250 ppm, and more preferably from about 2 to about 50 ppm.

In preferred embodiment the admixture of the dispersed phase polymer containing water external emulsion and cationic metal salt solution are admixed with sufficient water, including the water of the emulsion and the solution and any further dilution water, so that the combined weight percent of the anionic vinyl polymer and cationic metal salt is at least 0.5 based on total weight of the composition.

In preferred embodiment the carboxylate-containing vinyl polymer is admixed with the cationic metal salt to provide a composition having a weight ratio of from 5 to 175 parts cationic metal salt per part anionic vinyl polymer.

EXAMPLE 1

An ethylacrylate/methacrylic acid copolymer latex was prepared by polymerization of a mixture containing 65 mole percent ethylacrylate and 35 mole percent methacrylic acid using standard free radical, emulsion polymerization techniques, continuing the polymerization until substantially all monomer was polymerized, to provide a water-external latex containing 30 weight percent polymer actives. The ethylacrylate/methacrylic acid copolymer produced had a molecular weight within the range of 3,000,000 to 5,000,000 (determined by the reduced specific viscosity method). Fifty grams of this latex was slowly added to 950 grams of an aqueous solution containing from about 31 to 33 weight percent sodium aluminate as $NaAlO_2$ and having a pH of greater than 12, over a 45 minute period. The sodium aluminate solution was under constant agitation and held at a temperature of 230° F. (110° C.) throughout the latex addition period. Upon completion of the latex addition, the resultant blend was cooled to ambient room temperature. The blend was a clear, turbidity-free aqueous solution, having a viscosity of less than 2,000 cps as measured on a Brookfield viscometer. The blend may be characterized as containing a weight ratio of anionic polymer to sodium aluminate of about 1 to 20, and as containing about 1.5 weight percent anionic polymer and about 30 weight percent sodium aluminate.

Clarification Activity Test Method

In the following Examples 2 to 13 and comparative examples, the following "jar test" was employed to determine water clarification efficiency of the various agents. For a given series, a sufficient quantity of the water to be tested was obtained, and a 500 ml. sample of such water was placed in a 1,000 ml. beaker for each test to be run. The beakers were then equiped with a "gang stirrer", i.e., a plurality of stirring paddles under a central control to provide simultaneous and uniform agitation to each sample. The desired clarification agent was added to each sample, or none in the instance of a blank, and the series, at ambient room temperature, was subjected first to high speed agitation for three minutes followed immediately by 7 minutes of slower agitation. Agitation was then stopped and the samples in each beaker were observed. The floc and supernatant of each sample were then given a numerical rating of from 1 to 10+ as follows. The floc was rated on its appearance, speed of formation, relative size and uniformity, compactness and time required for it to float to the surface; a 10+ floc rating was the highest achievable and a rating of 1 indicates that no floc formation at all was detected. For the supernatant, the ratings were based on clarity, a rating of 10+ for clarity being equal to the clarity of tap water and a rating of 1 indicating that no clarification activity was detected.

EXAMPLES 2 TO 13 AND COMPARATIVE EXAMPLES

Using the "clarification activity test method" described above, the action of a sodium aluminate/methacrylic acid copolymer blend solution on various oily waste waters was determined in comparison to its components alone, its components added separately, various commercial water clarification products, and at instances to blanks. The waste water samples were obtained from four commercial oil fields located in western Texas. All were typical of production in western Texas and contained chlorides at concentrations from about 50,000 to 70,000 ppm. The oily waste water samples are herein designated A, B, C, or D, each designation referencing the oil field from which the water was obtained. The floc and supernatant ratings for each sample, and where useful, certain comments, are set forth below in Table I wherein each "series", i.e., samples tested simultaneously, are identified by Roman Numerals. The term "commercial Product" refers to the commercial water clarification product then in use at the oil field from where the water sample was obtained. (The Commercial Products of oil fields A, C, and D were the same.) The term "Blend" refers to the blend of sodium aluminate and ethylacrylate/methacrylic acid blend of Example 1 above, and "Copolymer Latex" refers to the ethylacrylate/methacrylic acid copolymer latex used to prepare the Blend. For each sample, both the type and level of additive are identified, the additive level in all instances being specified as parts product (not actives) per million parts waste water (ppm). Each additive (product) was introduced to the sample as a diluted test solution containing 1 part product and 99 parts additional dilution water. Thus in Table I 30 ppm of the Blend is equivalent to about 9 ppm of $NaAlO_2$ and 0.45 ppm of the copolymer actives; 30 ppm of $NaAlO_2$ Solution is equivalent to about 9.5 ppm of $NaAlO_2$; 1 ppm of the Copolymer Latex is equivalent to 0.3 ppm of the copolymer actives. Sample treatments not within the scope of the present invention are comparative examples, designated "a" through "dd".

TABLE I

| Series | Example No. | Water Sample | Additive | Floc Rating | Supernatant Rating | Comments |
|---|---|---|---|---|---|---|
| I | 2 | A | 30 ppm Blend | 8 | 8 | good floc |
| I | a | A | 29 ppm $NaAlO_2$ Soln. and 1 ppm Copolymer Latex | 8 | 8 | good floc |
| II | 3 | A | 30 ppm Blend | 6 | 7 | good floc |
| II | b | A | 30 ppm $NaAlO_2$ Soln. | 7 | 5 | |
| II | c | A | 30 ppm Commercial Product | 5 | 5 | |
| III | e | A | 30 ppm Copolymer Latex | 1 | 1 | |
| IV | 4 | B | 30 ppm Blend | 8 | 8+ | best floc |
| IV | f | B | 30 ppm $NaAlO_2$ Soln. | 6 | 3 | loose floc |
| IV | g | B | 30 ppm Commercial Product | 1 | 1 | no effect |
| V | 5 | B | 30 ppm Blend | 8 | 8+ | good floc |
| V | h | B | 30 ppm Copolymer Latex | 1 | 1 | no effect |
| V | i | B | 40 ppm $NaAlO_2$ Soln. | 5+ | 5 | |
| V | j | B | none | 1 | 1 | no effect |
| VI | 6 | B | 30 ppm Blend | 8+ | 8+ | |
| VI | k | B | 29 ppm $NaAlO_2$ Soln. and 1 ppm Copolymer Latex | 8+ | 8+ | |
| VI | l | B | 29 ppm $NaAlO_2$ Soln. and 2 ppm Copolymer Latex | 8+ | 8+ | |
| VII | 7 | C | 10 ppm Blend | 6 | 7− | |
| VII | 8 | C | 20 ppm Blend | 8 | 9 | good floc |

TABLE I-continued

| Series | Example No. | Water Sample | Additive | Floc Rating | Supernatant Rating | Comments |
|---|---|---|---|---|---|---|
| VII | 9 | C | 30 ppm Blend | 8 | 10⁻ | large tight floc |
| VII | m | C | none | 1 | 1 | |
| VIII | n | C | 10 ppm Aluminate Soln. | 6 | 6 | |
| VIII | o | C | 20 ppm Aluminate Soln. | 7 | 8 | loose floc |
| VIII | p | C | 30 ppm Aluminate Soln. | 7 | 8 | large loose floc |
| VIII | q | C. | none | 1 | 8 | |
| IX | r | C | 10 ppm Commercial Product | 2 | 2 | poor floc |
| IX | s | C | 20 ppm Commercial Product | 4 | 4 | poor floc |
| IX | t | C | 30 ppm Commercial Product | 5 | 5+ | very small floc |
| IX | u | C | none | 1 | 1 | |
| X | 10 | C | 30 ppm Blend | 9 | 10⁻ | Best floc |
| X | v | C | 30 ppm NaAlO$_2$ Soln. | 8+ | 8+ | loose floc |
| X | w | C | 30 ppm Copolymer Latex | 1 | 1 | no effect |
| X | x | C | 30 ppm Commercial Product | 5 | 5 | poor floc |
| XI | 11 | C | 30 ppm Blend | 9 | 10 | |
| XI | y | C | 29 ppm NaAlO$_2$ Soln. and 1 ppm Copolymer Latex | 9 | 10⁻ | good floc |
| XI | z | C | 29 ppm Commercial Product and 1 ppm Copolymer Latex | 6+ | 6+ | |
| XII | 12 | D | 30 ppm Blend | 8+ | 8+ | best floc |
| XII | aa | D | 30 ppm NaAlO$_2$ Solution | 8⁻ | 8+ | |
| XII | bb | D | 30 ppm Commercial Latex | 7 | 7 | |
| XIII | cc | D | 30 ppm Copolymer Latex | 1 | 1 | |
| XIV | 13 | D | 30 ppm Blend | 9⁻ | 8+ | |
| XIV | dd | D | 29 ppm NaAlO$_2$ Soln. and 1 ppm Copolymer Latex | 8+ | 8+ | |

From the test results set forth on Table 1 above it is seen that the performance of blend of the sodium aluminate and methacrylic acid copolymer, prepared as described in Example 1, in oily waste water clarification is comparable to that of treatment with a combination of the components of the blend added as separate aqueous solutions. (Shown in Series I, VI, XI and XIV.) Hence formulation of the blend in accordance with the method of the present invention has no deleterious effect on the activity of either ingredient. The test results also demonstrate that neither component of the blend alone performs to the extent of the combination, either as the blend or added separately, and hence the performance of the blend cannot be attributed to only one of the two components. The blend is shown more active than sodium aluminate alone, even over a range of levels. (See Series II, IV, V, VII, VIII, X and XII.) The methacrylic acid copolymer alone has no effect. (See Series II, V, X and XIII.) Moreover the blend is shown to be of commercial standards, performing better than the commercial products being used at each oil field, even when the methacrylic acid copolymer is used together with the commercial product. (See Series II, IV, VII, IX, X, XI and XII.)

EXAMPLE 14

A sample of the sodium aluminate/methacrylic acid copolymer blend, prepared as described in Example 1 above, was stored at ambient room temperature for eight months and throughout such storage period the integrity and activity of the blend's components were retained.

INDUSTRIAL APPLICABILITY OF THE INVENTION

The method, composition, and process of the present invention are applicable to the water clarification industries and industries utilizing water clarification treatments.

I claim:

1. A process of clarifying water comprising:
adding to water to be clarified an effective amount of a composition comprised of an alkali metal aluminate;
an anionic vinyl polymer which is comprised of at least 90 weight percent of units having the Formula I of

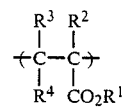

wherein R$^1$ is hydrogen, alkali metal cation, ammonia cation, or alkyl of 1 to 16 carbon atoms, and R$^2$, R$^3$, and R$^4$ are each independently hydrogen, alkyl of 1 to 16 carbon atoms, or a carboxylic acid moiety or water soluble salt thereof, provided said polymer contains no more than 70 weight percent of units of said Formula I comprised of a carboxylic acid or water soluble salt thereof moiety and which contains less than 10 total carbon atoms;
wherein said anionic vinyl polymer has an average molecular weight of at least 500,000,
wherein the weight ratio of said alkali metal aluminate and said anionic vinyl polymer is from 5 to 175 alkali metal aluminate per part anionic vinyl polymer,
and water;
and wherein said composition is an ungelled aqueous solution having a pH of at least 10;
agitating said water to form a floc; and separating the floc from a clarified supernatent.

2. The process of claim 1 wherein said cationic metal salt is an alkali metal aluminate.

3. The process of claim 1 wherein said anionic vinyl polymer contains no more than 60 weight percent of units of said Formula I comprised of a carboxylic acid or water soluble salt thereof moiety and which contains less than 6 total carbon atoms.

4. The process of claim 1 wherein said anionic vinyl polymer contains no more than 35 weight percent of units of said Formula I comprised of more than one carboxylic acid or water soluble salt thereof functionality.

5. The process of claim 1 wherein said anionic vinyl polymer is comprised of at least 95 weight percent of units having said Formula I wherein R$^1$ is hydrogen, alkali metal cation, ammonia cation, or alkyl or 1 to 4 carbon atoms, and $R^2$, $R^3$, and $R^4$ are each independently hydrogen or alkyl, wherein $R^2$, $R^3$, and $R^4$ together contain no more than 2 carbon atoms, and wherein said polymer contains no more than 70 weight percent of said unit of said Formula I containing a carboxylic acid or water soluble salt thereof.

6. The process of claim 5 wherein said composition is added to said water in an amount to provide from 0.5 to 250 ppm of said composition in said water.

7. The process of claim 6 wherein said composition is added to said water in an amount to provide from 2 to 50 ppm of said composition in said water.

8. The process of claim 1 wherein said anionic vinyl polymer has an average molecular weight of at least 1,000,000.

9. The process of claim 1 wherein said composition is added to said water in an amount to provide from 0.5 to 250 ppm of said composition in said water.

10. The process of claim 9 wherein said composition is added to said water in an amount to provide from 2 to 50 ppm of said composition in said water.

* * * * *